(12) United States Patent
McDermid

(10) Patent No.: US 9,910,553 B2
(45) Date of Patent: Mar. 6, 2018

(54) MULTI-TOUCH RESISTIVE TOUCH-SCREEN SENSOR AND CONTROLLER ASSEMBLY

(71) Applicant: William James McDermid, Niwot, CO (US)

(72) Inventor: William James McDermid, Niwot, CO (US)

( * ) Notice: Subject to any disclaimer, the term of this patent is extended or adjusted under 35 U.S.C. 154(b) by 265 days.

(21) Appl. No.: 14/730,204

(22) Filed: Jun. 3, 2015

(65) Prior Publication Data

US 2015/0355759 A1    Dec. 10, 2015

Related U.S. Application Data

(60) Provisional application No. 62/007,594, filed on Jun. 4, 2014.

(51) Int. Cl.
*G06F 3/047* (2006.01)
*G06F 1/16* (2006.01)
*G06F 3/041* (2006.01)

(52) U.S. Cl.
CPC ............... *G06F 3/047* (2013.01); *G06F 1/16* (2013.01); *G06F 3/0416* (2013.01)

(58) Field of Classification Search
CPC ........... G06F 1/16; G06F 3/0416; G06F 3/047
See application file for complete search history.

(56) References Cited

U.S. PATENT DOCUMENTS

| 3,711,627 | A | * | 1/1973 | Maringulov | H01B 7/083 139/425 R |
| 4,385,215 | A | * | 5/1983 | Lemberg | H01H 13/702 200/292 |
| 5,283,558 | A | * | 2/1994 | Chan | G06F 3/045 178/18.05 |
| 8,298,968 | B2 | * | 10/2012 | Swallow | D03D 1/0088 345/173 |
| 8,866,758 | B2 | * | 10/2014 | Schmidt | G06F 3/047 178/18.05 |
| 2011/0318985 | A1 | * | 12/2011 | McDermid | D02G 3/441 442/189 |
| 2012/0038584 | A1 | * | 2/2012 | Liu | G06F 3/0416 345/174 |
| 2012/0188201 | A1 | * | 7/2012 | Binstead | G06F 3/041 345/174 |

(Continued)

*Primary Examiner* — Afroza Chowdhury

(57) ABSTRACT

A method and apparatus are provided for a touch sensor made from a flexible substrate with voids and resistive conductive elements suspended within it. The voids in the substrate are positioned in the areas where conductive elements cross. The substrate holds the conductive elements apart in these voids when no pressure is applied, but allows the crossing conductive elements to come into contact when pressure from a touch is applied. The conductive elements follow a serpentine path to increase the number of crossings for a given number of conductive elements. The ends of the conductive elements are connected to control electronics around the periphery of the substrate that energizes select conductive elements with constant voltage and constant current signals and measures voltage from other conductive elements to ascertain touch locations and touch contact areas respectively. The sensor can be planner or made to follow contoured surfaces such as the outer surfaces of a mobile electronic device.

6 Claims, 10 Drawing Sheets

(56) References Cited

U.S. PATENT DOCUMENTS

| | | | |
|---|---|---|---|
| 2012/0212425 A1* | 8/2012 | Schmidt | G06F 3/047 |
| | | | 345/173 |
| 2013/0063367 A1* | 3/2013 | Jang | G06F 3/011 |
| | | | 345/173 |
| 2015/0370363 A1* | 12/2015 | Trend | G06F 3/044 |
| | | | 345/174 |

* cited by examiner

MULTI-TOUCH RESISTIVE TOUCH-SCREEN SENSOR AND CONTROLLER ASSEMBLY

CROSS REFERENCE TO RELATED APPLICATIONS

This application is related to U.S. Pat. No. 8,355,009 filed Apr. 22, 2008 and entitled "METHOD AND APPARATUS FOR DETERMINING COORDINATES OF SIMULTANEOUS TOUCHES ON A TOUCH SENSOR PAD", which is by the same inventor and hereby incorporated by reference.

This non-provisional application claims priority to U.S. provisional application 60/007,594 filed on Jun. 4, 2014, which is incorporated herein by reference.

BACKGROUND OF THE INVENTION

1. Field of the Invention

This invention relates to a unique construction method for a multi-touch resistive touch-screen sensor.

2. Statement of the Problem

Different technologies exploit various parameters of layered materials to make sensors. Current resistive sensors are constructed to hold two linearly resistive layers apart at rest that are allowed to come into contact upon a touch event. The resistor dividers resulting from a touch are read by control electronics and a location is calculated. Capacitive sensors are constructed from conductive layers that are driven by signals to generate an electric field. When the base capacitance is altered by another electric field, a user's finger for example, the differences are measured by control electronics and a location is calculated. Inductive sensors are driven by signals to generate a magnetic field. When the magnetic field is altered by another magnetic field, a stylus with a coil for example, the differences are measured by control electronics and a location is calculated. Surface Acoustic Wave sensors use transducers to initiate mechanical waves in a sensor, and control electronics process the reflected wave pattern to look for changes caused by touch points reflecting and/or absorbing the wave energy to calculate a location. IR sensors shine a grid of beams across the sensor surface that is monitored on opposing sides. A touch breaks the beam and the control electronics determine a location.

Of these sensor technologies, resistive has distinct advantages. Resistive sensors are like mechanical switches so respond to touches from all actuators such as fingers, even when gloved, and common implements like pencils or pens. A touch is not ambiguous because the same pressure that informs the electronics of a touch informs the user of a touch. Resistive also has a high signal to noise ratio allowing for the possibility of high resolution.

The primary disadvantages of current resistive touch-screens are optical clarity and durability. Both of these disadvantages are due to a sensor construction that requires a thin air gap between two clear conductive coating layers. This construction reduces optical clarity by adding additional reflective layers due to the miss match of the index of refraction between air and the clear conductive coatings. Durability is compromised by repeated contact of the two delicate clear conductive coatings and a top sheet that is soft to allow for mechanical deflection.

SUMMARY OF THE SOLUTION

The present invention solves the above and other problems by constructing a sensor that encapsulates thin electrically conductive elements in a substrate made from flexible material. Conductive elements are organized into two groups where conductive elements within a group do not cross one another, but the groups are arranged where conductive elements in a first group cross the conductive elements in the second group. When relaxed, the substrate holds crossing conductive elements apart. A void in the substrate in the area of the intersection of crossing conductive elements allow the conductive elements to come into contact when the substrate is compressed. Electronics connected to the ends of the conductive elements around the periphery detect the contact and ascertain the location and contact area of the contacting conductive elements.

Aspects

An aspect of the invention is crossing conductive elements and small voids suspended in a flexible substrate where the conductive elements pass through the voids at the conductive elements' crossings. The substrate holds the crossing conductive elements apart when relaxed but allows the crossing conductive elements to come into contact when compressed.

Preferably, the conductive elements are thin to minimize their interference with light passing through the substrate.

Preferably, the conductive elements run in a serpentine pattern to cover the entire surface-area of the sensor using fewer conductive elements than would otherwise be required for a given number of conductive element crossings.

Another aspect of the invention is how the conductive elements have a resistance so they can be energized by a constant voltage to set up a voltage gradient along the length of the conductive element, and where a crossing conductive element currently in contact with the energized conductive element rises to the voltage at the point of contact in the energized conductive element, and where the voltage of the crossing conductive element can be read to determine where along the energized conductive element the contact is occurring.

Another aspect of the invention is how the resistive conductive elements can be energized by a constant current so a voltage measurement across the length of the conductive element correlates to the total resistance of the conductive element, and where a touch causes crossing conductive elements to short across the energized conductive element's serpentine switchbacks, thereby changing its resistance and measured voltage.

Preferably, as more pressure is applied by the touch, more serpentine switchbacks are shorted thereby further lowering the resistance and the measured voltage.

Preferably, larger implements actuating a touch will short more serpentine switchbacks thereby lowering the resistance and the measured voltage Another aspect of the invention is how the conductive elements are organized into two groups where the conductive elements within a group do not cross one another, but were the conductive elements in the first group cross the conductive elements in the second group.

Preferably, the sensor is constructed with two sheets where the conductive elements from the first group are in a first sheet, and the conductive elements in the second group are in a second sheet.

Preferably, the inner face of each sheet has an uneven surface where segments of the conductive element in a sheet are alternately exposed above the inner face and embedded below the inner face. When the inner faces of the two sheets are brought together, the exposed conductive element segments in the first sheet do not touch the exposed conductive element segments of the second sheet unless an external force normal to the sheets compresses the two-sheet assembly.

Preferably, the relief pattern of the uneven surfaces on the inner faces of the two sheets are designed to interlock to align the two sheets to one another as they are brought together.

Another aspect of the inventions is how the interlocking relief pattern can be elongated in specific sections so the sheets follow contoured surfaces when they are brought together.

Another aspect of the invention is how the contoured surface the assembled sheets are following is the outside surface of a mobile electronic device such as a cell phone.

Preferably, the assembled sheets form the shape of a sleeve or pocket the electronic device slides into.

DESCRIPTION OF THE DRAWINGS

The above and other advantages and features of the invention may be better understood from a reading of the detailed description taken in conjunction with the drawings. The same reference number represents the same element on all drawings.

DETAILED DESCRIPTION OF THE INVENTION

FIGS. 1-12 and the following description depict specific exemplary embodiments of the invention to teach those skilled in the art how to make and use the best mode of the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
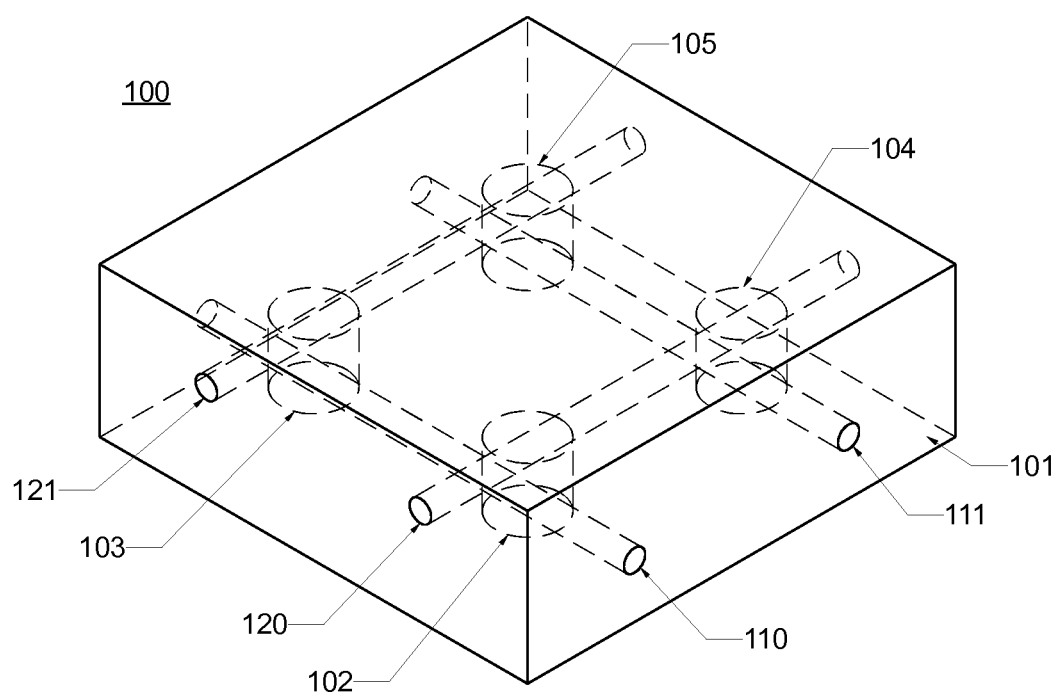
FIG. 1 is an enlarged view of a touch sensor segment showing crossing conductive elements in an isometric view.

FIG. 1 shows an enlarged isometric view of a small segment of touch sensor 100. The non-conductive substrate 101 holds horizontal resistive conductive elements 110 and 111, and vertical conductive elements 120, and 121. Conductive element 110 crosses conductive element 120 at void 102 in substrate 101. Likewise, conductive element 110 crosses conductive element 121 at void 103, conductive element 111 crosses conductive element 120 at void 104, and conductive element 111 crosses conductive element 121 at void 105.

Figure 2:
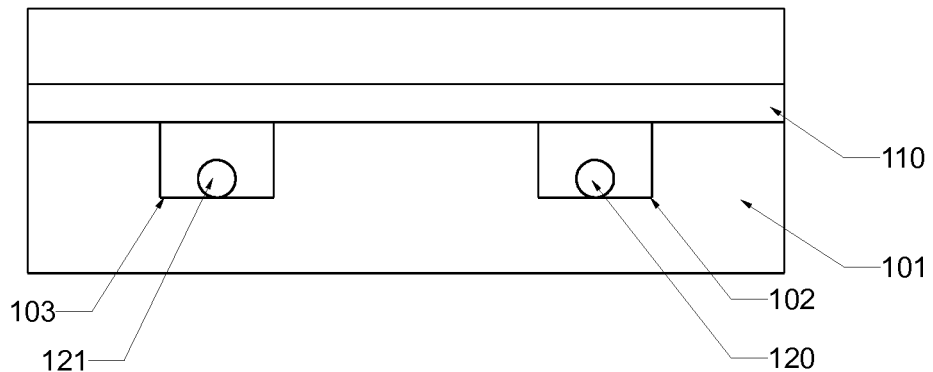
FIG. 2 shows an enlarged touch sensor segment in a cut away side view with the crossing conductive elements passing through a void.

FIG. 2 is an enlarged cut away view of sensor 100 that shows how substrate 101 keeps horizontal conductive element 110 from touching vertical conductive elements 120 and 121 when no pressure is applied to the sensor.

Figure 3:
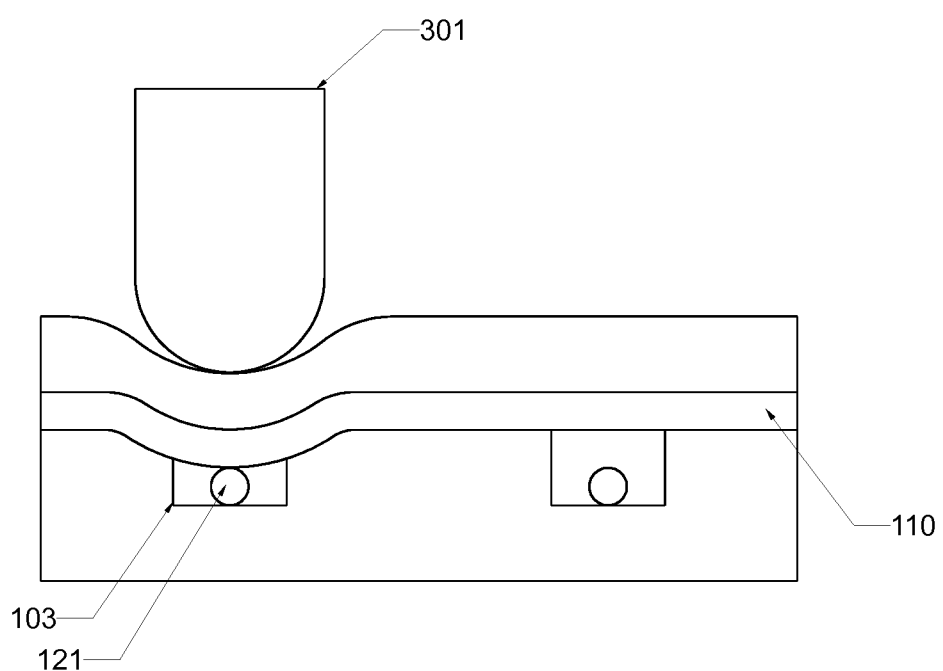
FIG. 3 shows the view from FIG. 2 with a touch causing the crossing conductive elements to come into contact.

FIG. 3 is the same view as FIG. 2, but with a touch applied, showing horizontal conductive element 110 coming into contact with vertical conductive element 121 within void 103.

Figure 4:
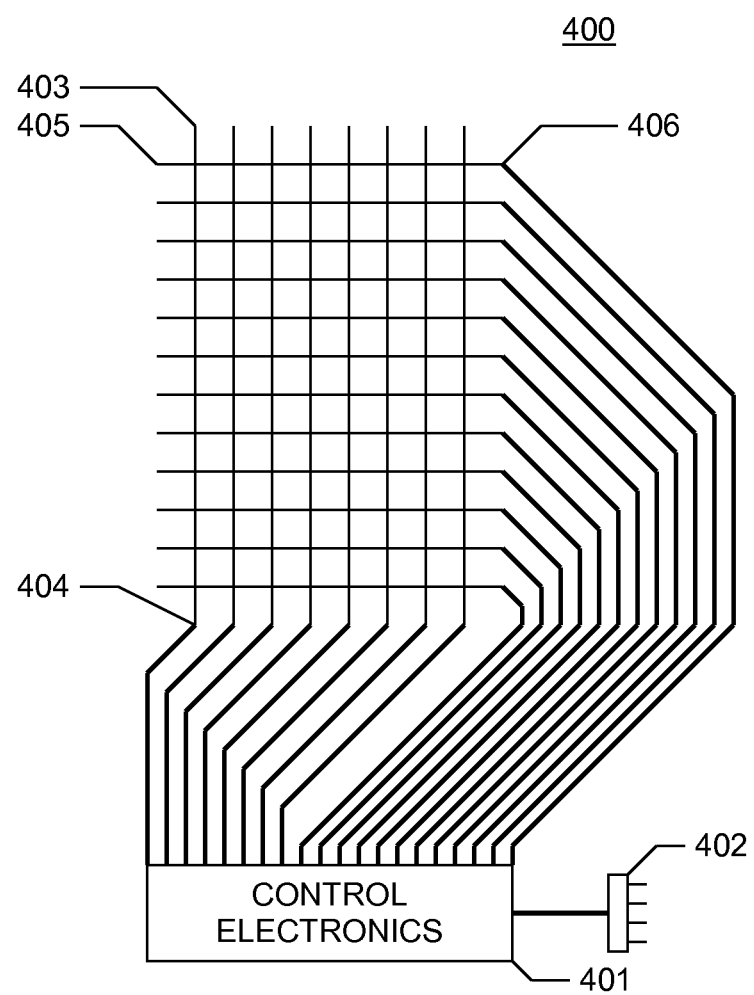
FIG. 4 through FIG. 7 show alternative schemes for connecting conductive elements to control electronics.

FIG. 4 shows a schematic view of the sensor conductive elements connected to the control electronics 401. The control electronics can scan the sensor looking for touches and determining coordinates using common keyboard matrix scanning methods. In this connection scheme, each conductive element requires a separate connection to the control electronics. As sensors get larger and touch resolution gets higher, the number of connections can grow into the thousands, making this approach impractical in many applications.

Figure 5:
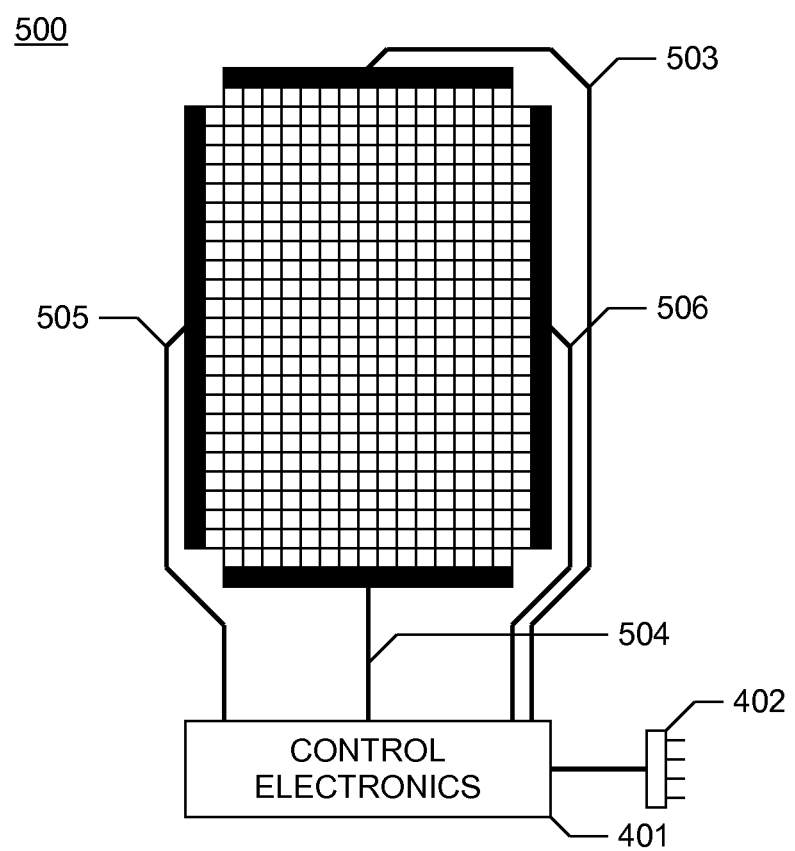

FIG. 5 shows a schematic view of the sensor conductive elements connected together at the ends prior to connecting to the control electronics. The control electronics can scan the sensor looking for touches and determining coordinates using common 4-wire resistive scanning methods. In this connection scheme, the control electronics can resolve only a single touch at a time. This scheme also requires the resistances of the conductive elements to be tightly controlled and matched to keep the calibration procedure manageable.

Figure 6:
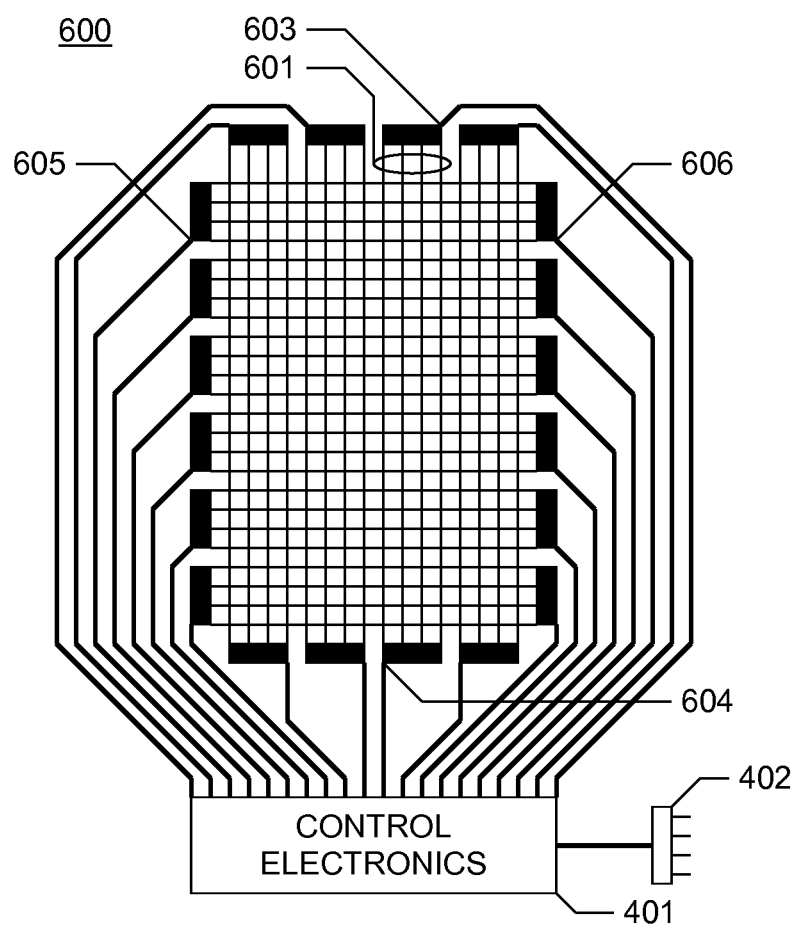

FIG. 6 shows a schematic view of the sensor conductive elements broken into groups where the ends of the conductive elements in a group are connected together prior to being connected to the control electronics. The control electronics can scan the sensor looking for touches and determining coordinates using the multi-touch resistive methods disclosed in related U.S. Pat. No. 8,355,009. This connection scheme requires the resistances of the conductive elements to be tightly controlled and matched to keep the calibration procedure manageable.

Figure 7:
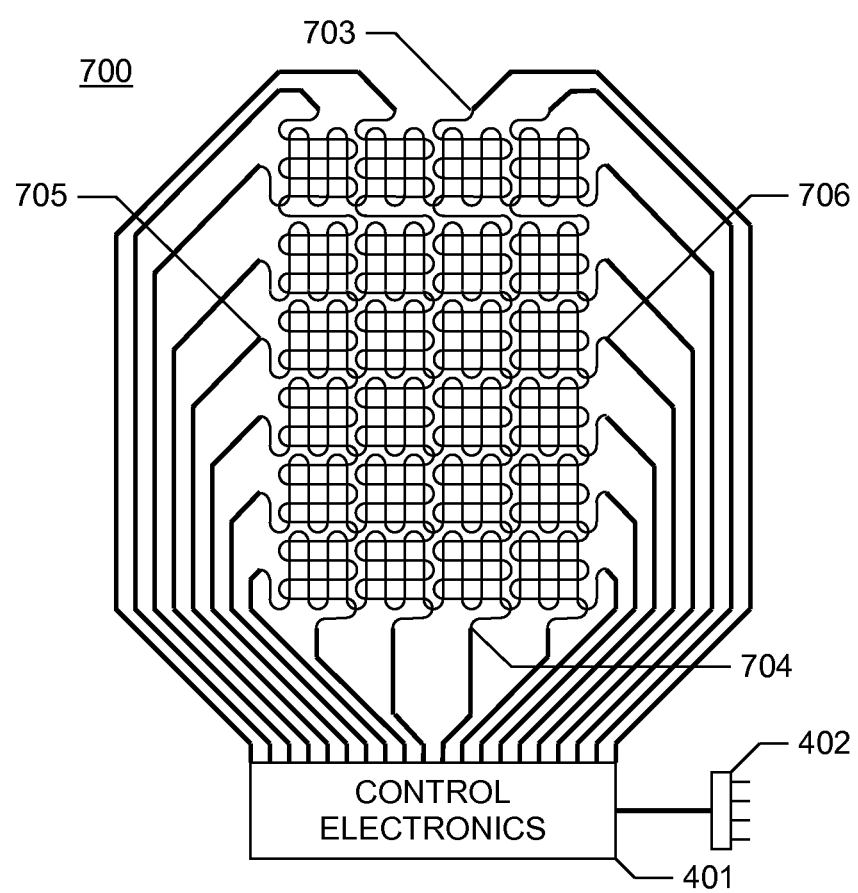

FIG. 7 shows a connection scheme where conductive elements are laid out in a serpentine pattern. The control electronics can scan the sensor looking for touches and determining coordinates using the multi-touch resistive methods disclosed in related U.S. Pat. No. 8,355,009. This connection scheme overcomes the connection problems of the scheme in FIG. 4, the single touch problem of the scheme in FIG. 5, and the calibration problems of the schemes in FIG. 5 and FIG. 6.

In accordance with the multi-touch resistive scanning method, control electronics 401 sends driving voltages and currents to the sensor contact pads and measures signals coming from the sensor contact pads. The driving and measuring allows the control electronics to detect the locations and contact areas of touches to the sensor.

Figure 8:
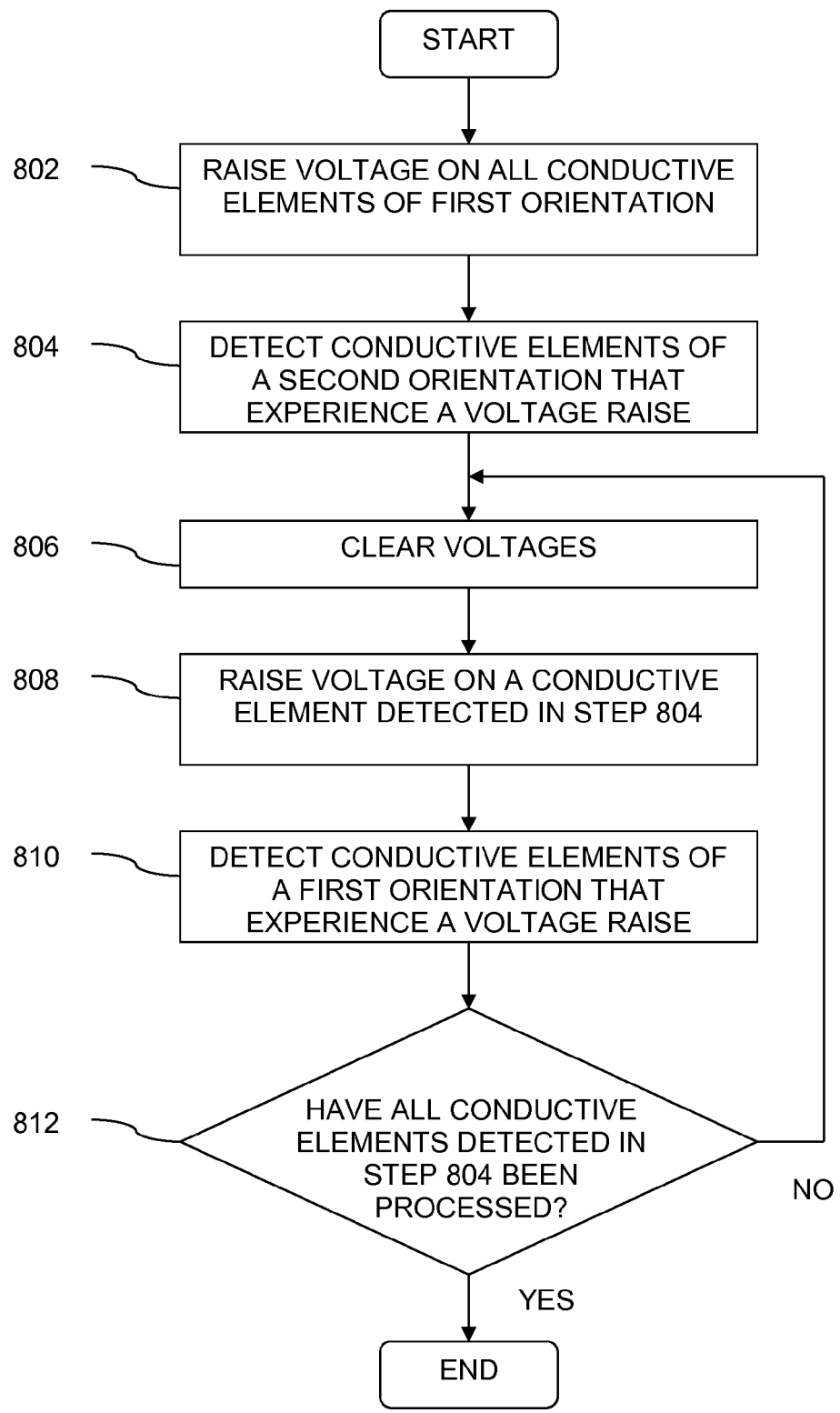
FIG. 8 is a flowchart of a process for detecting conductive elements contacting one-another.

Parallel searching is an efficient technique for identifying which conductive elements in a first orientation are contacting conductive elements in a second orientation due to touches. FIG. 8 illustrates a flow chart of method 800 for conducting a parallel search of a plurality of conductive elements to identify all conductive element crossings that are experiencing a touch.

In step 802 control electronics 401 raises the voltage of all conductive elements in a first orientation. In step 804, control electronics 401 detects the conductive elements in a second orientation that experience a voltage increase. In step 806 control electronics 401 clears the voltages on all conductive elements. In step 808, control electronics 401 raises the voltage of one of the conductive elements identified in step 804. In step 810 control electronics 401 detects conductive elements in the first orientation experiencing a voltage increase to identify the crossing conductive elements experiencing a touch point. In step 812, if there are additional conductive elements identified in 804 that have not been processed, then control electronics 401 loops to step 806. Otherwise, processing by method 800 ends having identified all conductive element crossings experiencing a touch.

Figure 9:
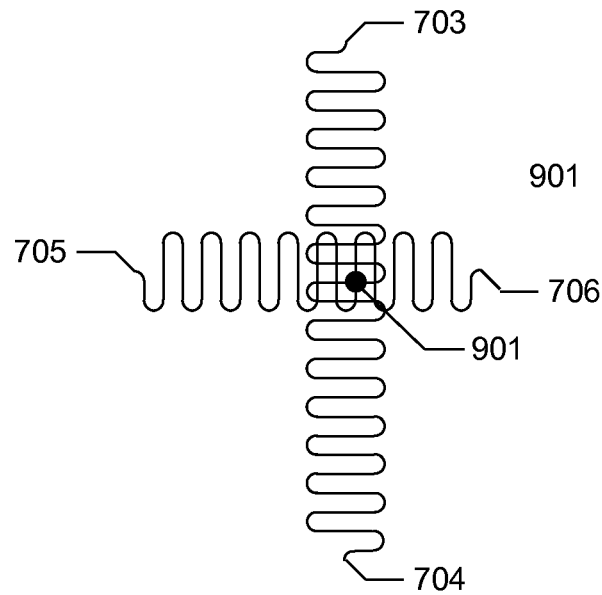
FIG. 9 is a schematic representation of a portion of a sensor with a small contact area touch point indicated.

FIG. 9 helps to explain the method for determining where along their lengths crossing conductive elements are contacting one-another. Control electronics 401 drives contact 703 to a voltage V+ and connects 704 to ground to set up a voltage gradient in linearly resistive conductive element 703-704. Conductive element 703-704 is contacting conductive element 705-706 due to a touch at location 901. The voltage Vi of conductive element 703-704 at the touch point can be read at contract 706. If 705-706 is the Yth of N conductive elements crossing conductive element 703-704, and, through a prior calibration process, the maximum value of the voltage in conductive element 703-704 when it touches conductive element 705-706 is known to be Vn and the minimum voltage is known to be V0, then the position of the touch is the fraction Y/N+(Vi−V0)/(Vn−V0) of the way up the length of conductive element 703-704. The location of the touch along conductive element 705-706 can be determined by driving conductive element 705-706 and measuring the voltage at contact 703 in a similar manor.

A touch may cause a conductive element in a first orientation to short across the switchbacks of a conductive element in a second orientation. In fact, the larger the contact area, the more switchbacks that are shorted. Knowing the contact area can be useful in determining what is touching the sensor, or determine the pressure of a touch.

Figure 10:
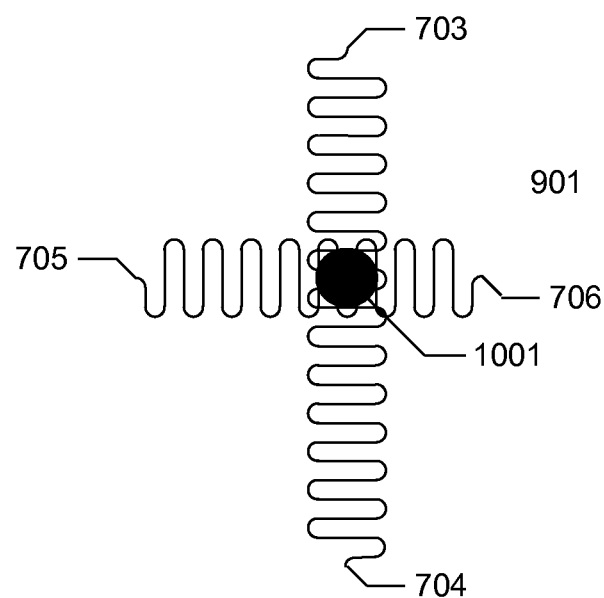
FIG. 10 is a schematic representation of a portion of a sensor with a larger contact area touch point indicated.

FIG. 10 helps to explain the method for determining how many switchbacks are shorted due to a touch. If conductive element 703-704 is driven with a constant current source "I", the voltage "V" at contact 703 is proportional to the resistance "R" of conductive element 703-704 according to V=IR. If touch 1001 causes "M" of the "N" switchbacks in conductive element 703-704 to be shorted then, if the contribution to the resistance by the short length of conductive element 705-706 is neglected, the resistance of conductive element 703-704 will be reduced by R*M/N. Thus the voltage read at contract 703 for touch 1001 can be used to determine the length of the touch along conductive element 703-704. The length of the touch along conductive element 705-706 can be determined by driving conductive element 705-706 with a constant current and reading the voltage at contact 705 in a similar manner.

Figure 11:
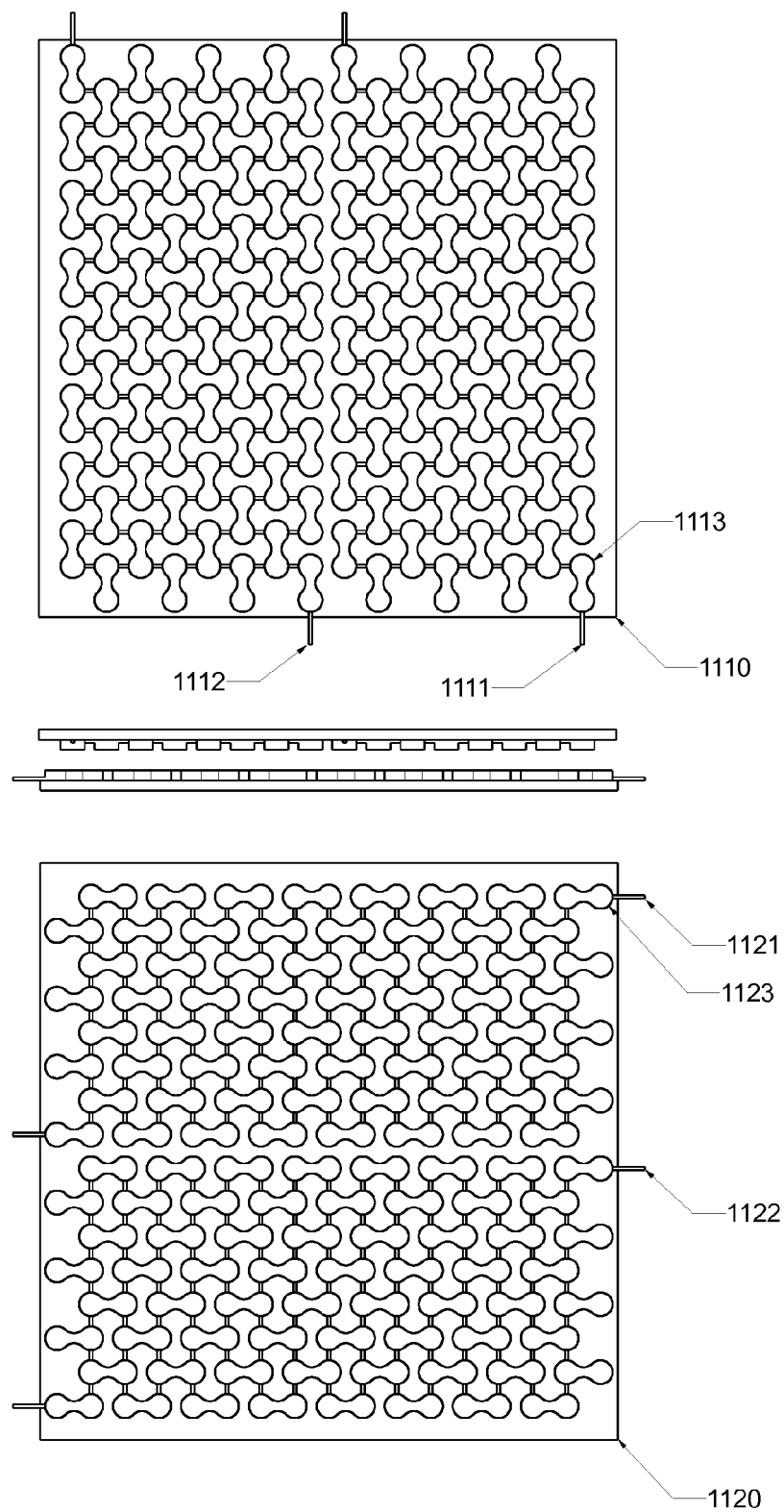
FIG. 11 is an exploded, open view of a sensor sheet showing details of the inside face.

FIG. 11 shows how a sensor with conductive elements and voids suspended in a substrate might be constructed. The top of the sensor is formed by sheet 1110 that holds vertical conductive elements 1111 and 1112. The bottom of the sensor is formed by sheet 1120 that holds horizontal conductive elements 1121 and 1122. 1113 is one of the 128 protuberances on the inner face of sheet 1110 that holds the conductive elements to the sheet. 1123 is one of the 128 protuberances on the inner face of sheet 1120 that holds the conductive elements to the sheet. In addition to holding the conductive elements, the protuberances on the two sheets interlock when the sheets are brought together to register the sheets to one-another and act as a spacer to maintain a gap between the crossing horizontal and vertical conductive elements. In this implementation, sheet 1110 is the same as sheet 1120 but rotated 90 degrees.

Figure 12:
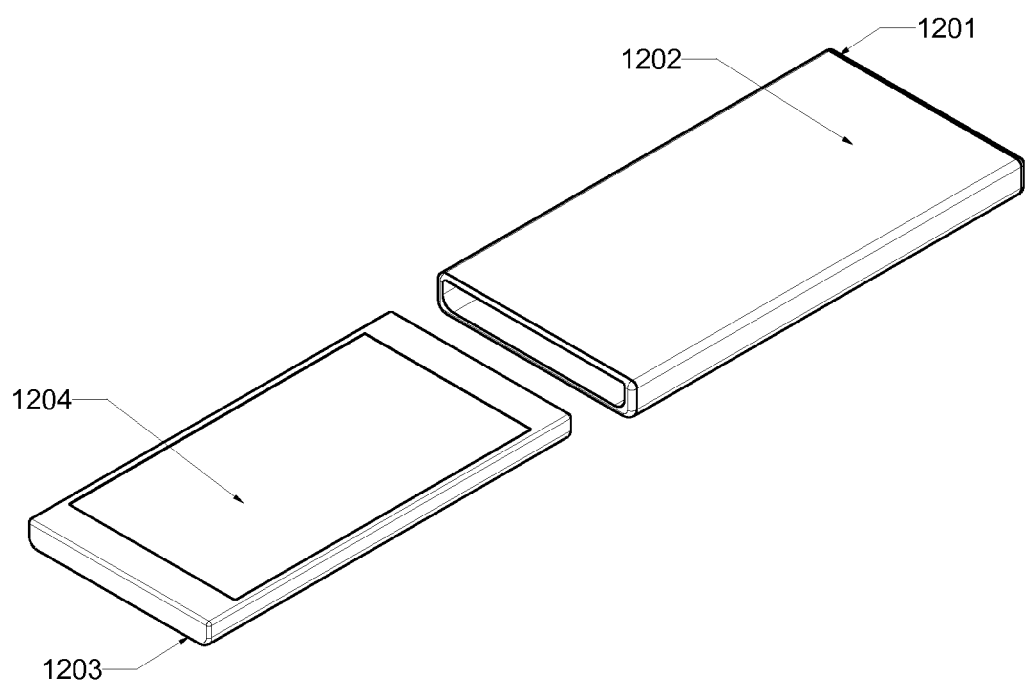
FIG. 12 is an isometric view showing a mobile electronic device sliding into a sensor formed into the shape of a sleeve.

FIG. 12 shows an example of how a two sheet sensor assembly can be formed into shapes other than planar sheets. Sensor 1201 is formed in the shape of a sleeve dimensioned to wrap around mobile electronic device 1203. Surface 1202 of sleeve 1201 is transparent to allow display 1204 of device 1203 to show through. The remaining surfaces of 1201 may or may not be transparent.

Although specific embodiments were described herein, the scope of the invention is not limited to those specific embodiments. The scope of the invention is defined by the following claims and any equivalents therein.

I claim:

1. A resistive touch sensor with crossing wires and voids suspended in a flexible substrate where the wires pass through the voids at the wires' crossings, and where the substrate holds the crossing wires apart when relaxed but allows the crossing wires to come into contact when compressed, and where the wires run in a serpentine pattern to cover the entire surface-area of the sensor using fewer wires than would otherwise be required for a given number of wire crossings, and where the wires have a resistance so they can be energized by a constant current so a voltage measurement across the length of the resistive wire correlates to the total resistance of the resistive wire, and where a touch causes crossing resistive wires to short across the energized resistive wire's serpentine switchbacks thereby changing its resistance and measured voltage, and where more pressure applied to the touch will short more serpentine switchbacks thereby further lowering the resistance and the measured voltage.

2. The resistive touch sensor in claim 1, where the wires are thin to minimize their interference with light passing through the substrate.

3. The resistive touch sensor in 1 where the crossing resistive wire currently in contact with the energized resistive wire rises to the voltage at the point of contact in the energized resistive wire, and where the voltage of the crossing resistive wire can be measured to determine where along the energized resistive wire the contact is occurring.

4. The resistive touch sensor in claim 1, where the wires are organized into two groups where the wires in one group do not cross one another, and the wires in a second group do not cross one another, but were the wires in the first group cross the wires in the second group, and where the sensor is constructed with two sheets where the wires from the first group are in a first sheet, and the wires in the second group are in a second sheet, and where the inner faces of the sheets have an uneven surface where segments of the wires in a sheet are exposed above the inner face so when the inner faces of the two sheets are brought together to make a touch sensor the exposed wire segments in the first sheet do not touch the exposed conductive element segments of the second sheet unless an external force normal to the sheets compresses the touch sensor assembly.

5. The resistive touch sensor in claim 4, where the relief pattern of the uneven surfaces on the inner faces of the two sheets are designed to interlock to align the two sheets to one another as they are brought together.

6. The resistive touch sensor in claim 5, where the relief pattern is modified in specific sections so the interlocking sheets follow contoured surfaces when they are brought together.

* * * * *